Oct. 21, 1958  R. E. HANSEN  2,856,675
METHOD OF MAKING TURBOMACHINE BLADING
Filed Nov. 8, 1954  3 Sheets-Sheet 1

INVENTOR.
Russell E. Hansen
BY
Paul Fitzpatrick
ATTORNEY

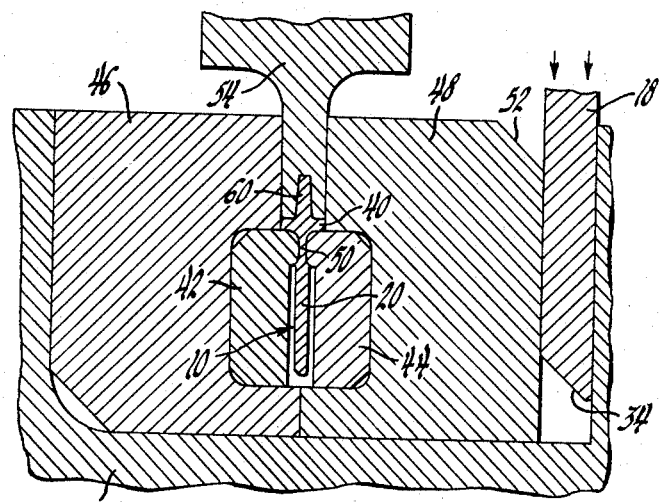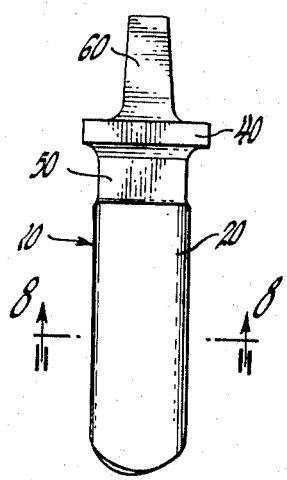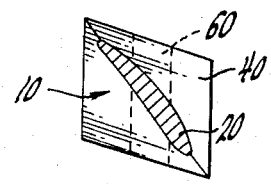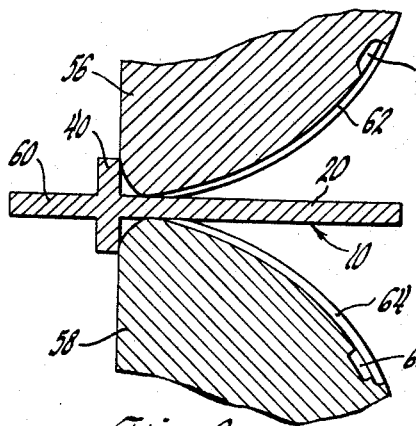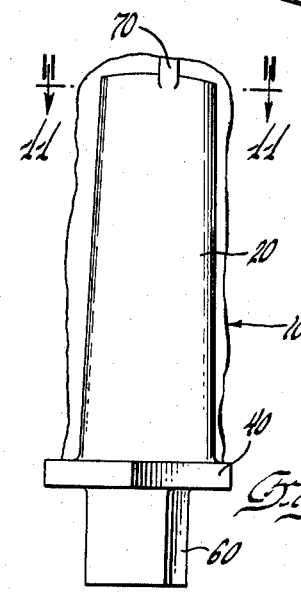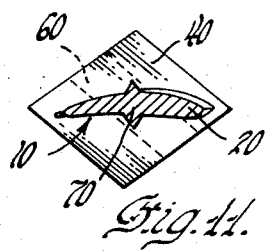

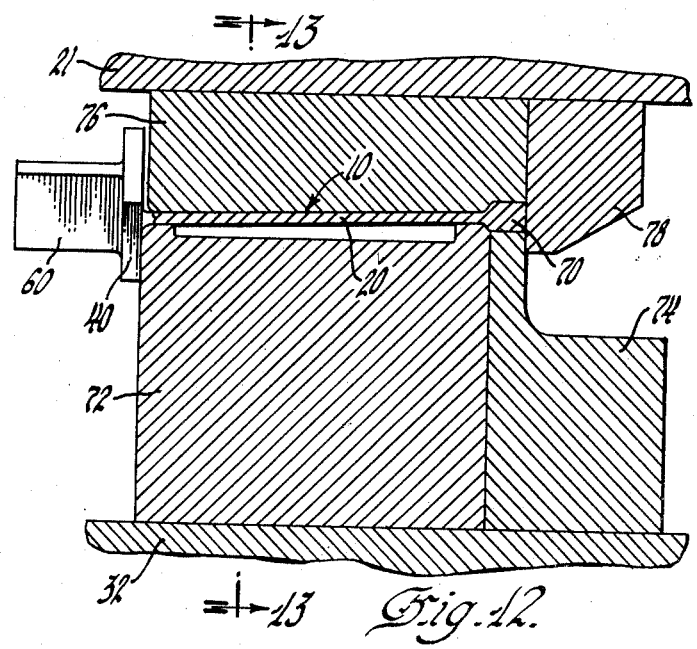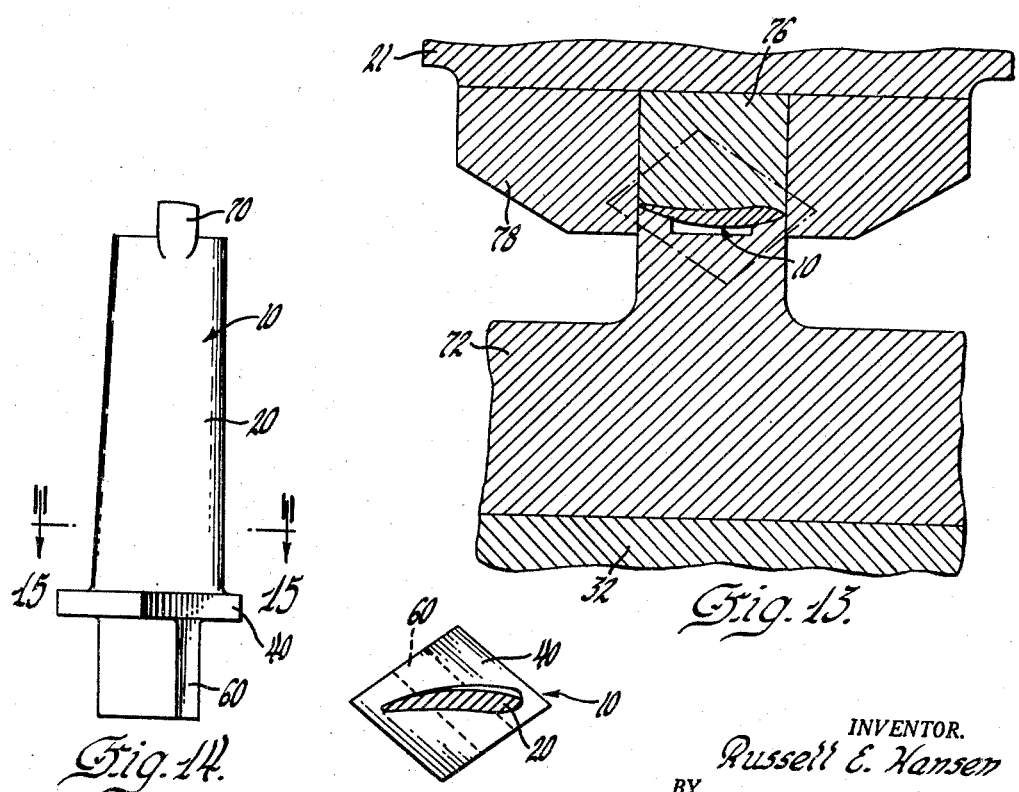

United States Patent Office 2,856,675
Patented Oct. 21, 1958

2,856,675

METHOD OF MAKING TURBOMACHINE BLADING

Russell E. Hansen, East Lansing, Mich., assignor to General Motors Corporation, Detroit, Mich., a corporation of Delaware Application November 8, 1954, Serial No. 467,393

3 Claims. (Cl. 29—156.8)

This invention relates to the manufacture of axial flow blading for gas turbine and air compressor turbomachines, such blades being hereinafter referred to generically as turbo-buckets.

An object of the invention is to cheapen turbo-bucket manufacture by forming the buckets by a series of inexpensive metal working operations.

Further objects and advantages of the present invention will be apparent from the following description, reference being had to the accompanying drawings, wherein a preferred form of the present invention is clearly shown.

In the drawings:

Figure 6 is a section of an extrusion die with the workpiece at a later stage of manufacture;

Figure 7 is an elevation of the workpiece after removal from the extrusion die of Figure 6;

Figure 8 is a section of the workpiece taken along the line 8—8 of Figure 7;

Figure 9 is a section of a gap roll with the workpiece at a later stage of manufacture;

Figure 10 is an elevation of the workpiece after removal from the gap roll of Figure 9;

Figure 11 is a section of the workpiece taken along the line 11—11 of Figure 10;

Figure 12 is a section of a shearing die with the workpiece at a later stage of manufacture;

Figure 13 is a section taken along the line 13—13 of Figure 12;

Figure 14 is an elevation of the workpiece after removal from the shearing die of Figures 12 and 13; and Figure 15 is a section of the workpiece taken along the line 15—15 of Figure 14.

Figure 1:
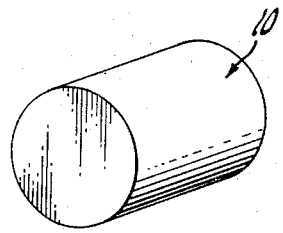
Figure 1 is a perspective view of a billet or workpiece that is formed into a turbo-bucket in accordance with the invention.
Figure 2:
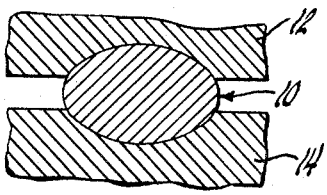
Figure 2 is a section of a forging die with the workpiece at one stage of manufacture.

Referring to the drawings, the turbo-buckets are fashioned from cylindrical stock that is sawed into circular sectioned billets 10, as illustrated in Figure 1. The billet is then cold-forged to oval section in a conventional press by dies 12 and 14, as shown by Figure 2. The entire billet is then softened in a conventional induction heater. The particular billet shown is of stainless steel for axial flow compressor blading and may be heated to approximately 2100° F.

Figure 3:
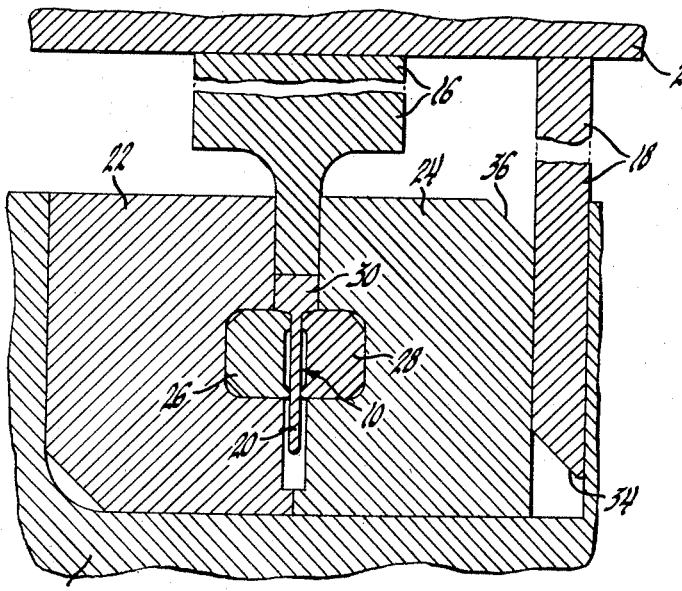
Figure 3 is a section of an extrusion die with the workpiece at a later stage of manufacture.
Figure 5:
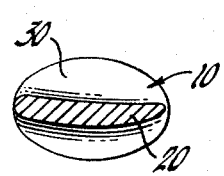
Figure 5 is a section of the workpiece taken along the line 5—5 of Figure 4.
Figure 4:
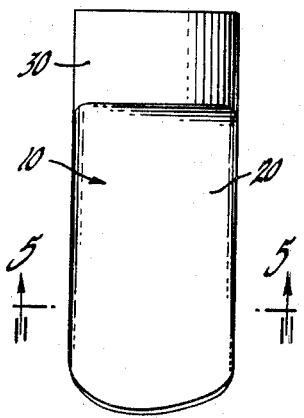
Figure 4 is an elevation of the workpiece after removal from the extrusion die of Figure 3.

The hot oval billet is next placed in a conventional press and partially extruded to rough shape the blade portion 20 to airfoil section, as illustrated in Figures 3 to 5, with the root portion 30 retaining the oval configuration. A punch 16 and a cam 18 are secured to the vertically movable platen 21 and split dies 22 and 24 carrying replaceable inserts 26 and 28 are supported in the fixed die block 32 to accomplish the extrusion. The die block cavity is wider than the split dies 22 and 24 so that the dies can move laterally for engagement with each other to form a matrix shaped in accordance with the shape of the billet as illustrated in Figures 4 and 5. The oval billet is inserted between the dies 22 and 24 and the dies are engaged by lowering the platen to engage the cam wedge surface 34 with the die wedge surface 36. Further lowering of the platen engages the punch with the billet to force the lower end thereof through the airfoil opening of the inserts 26 and 28 to form the blade portion 20.

In some instances flashing forms on the billet along the split line of the dies. The flashing is removed by a press shearing operation similar to a later described and illustrated press shearing operation.

If necessary, the billet is next descaled in a conventional shot-tumbling machine.

The billet root 30 is now reheated by a conventional induction coil to proper softness (approximately 2100° F. in the present example) in preparation for the next operation which comprises hot-forging the juncture of the blade and root to finish shape the blade portion 50, as illustrated in Figures 6 to 8. This forging or coining operation is accomplished by inserting the blade portion 20 between the split inserts 42 and 44 of the engageable dies 46 and 48. The dies are brought together on lowering of the platen by engagement of the cam wedge surface 34 with the die wedge surface 52 and the upper ends of the inserts 42 and 44 form a matrix that finish forges the blade portion 50.

Further lowering of the platen accomplishes the next operation which comprises hot-extruding the root portion 30 to form the tang 60 and shelf 40. The platen carries a punch 54 which has a socketed end that forms a matrix with the dies 46 and 48 to finish shape the root portion tang 60, as illustrated in Figures 6-8.

The billet is then annealed at approximately 1100° F. and descaled in preparation for the next operation which is illustrated in Figures 9-11. The billet is placed in a conventional gap rolling machine wherein gap rolls 56 and 58 are peripherally profiled at 62 and 64 to finish cold-roll the blade portion 20 to airfoil section. Small gap roll cavities 66 and 68 form a button 70 at the end of the blade portion 20 that is used to center the blade during the final grinding operation.

The gap rolling operation produces considerable flash which is removed by a shearing operation shown in Figures 12-15. The billet is first secured in fixed dies 72, 74 and 76 that enclose the blade portion except for flash. The platen 21 is then lowered with a die 78 to shear off the flash. A similar arrangement may be utilized to trim the flashing after the blade extrusion operation, if necessary.

Figures 14 and 15 illustrate the billet after completion of the foregoing operations. The billet is now a substantially finished turbo-bucket requiring only heat treatment and grinding for completion.

While the preferred embodiment of the invention has been described fully in order to explain the principles of the invention, it is to be understood that modifications of structure may be made by the exercise of skill in the art within the scope of the invention which is not to be regarded as limited by the detailed description of the preferred embodiment.

I claim:

1. A process of shaping a circular sectioned billet into a substantially finished turbo-bucket that includes an airfoil sectioned blade portion and a root portion comprising rough shaping the billet to oval section by forging, rough shaping the blade portion by extrusion, flash trimming the blade portion by shearing, finish shaping the blade portion immediately adjacent the root portion by forging, finish shaping the root portion by extrusion, finish shaping the remaining blade portion by gap rolling, and flash trimming the blade portion by shearing.

2. A process of shaping a circular sectioned billet into a substantially finished turbo-bucket that includes an airfoil sectioned balde portion having a centering button at the free end thereof and a root portion having a diamond sectioned shelf next the blade portion and a rectangular sectioned tang depending from the shelf comprising rough shaping the billet to oval section by forging, rough shaping the blade portion by extrusion, finish shaping the blade portion immediately adjacent the root portion by forging, finish shaping the root portion by extrusion, finish shaping the remaining blade portion including the centering button by gap rolling, and flash trimming the blade portion by shearing.

3. A process of shaping a circular sectioned billet into a substantially finished turbo-bucket that includes an airfoil sectioned blade portion having a centering button at the free end thereof and a root portion having a diamond sectioned shelf next the blade portion and a rectangular sectioned tang depending from the shelf comprising rough shaping the billet to oval section by stamping, rough shaping the blade portion by extrusion, flash trimming the blade portion by shearing, finish shaping the blade portion immediately adjacent the root portion by stamping, finish shaping the root portion by extrusion, finish shaping the remaining blade portion including the centering button by gap rolling, and flash trimming the blade portion by shearing.

References Cited in the file of this patent

UNITED STATES PATENTS

| | | |
|---|---|---|
| 1,883,519 | Brauchler | Oct. 18, 1932 |
| 2,013,622 | Bedford | Sept. 3, 1935 |
| 2,290,734 | Brassert | July 21, 1942 |
| 2,577,747 | Gibian | Dec. 11, 1951 |
| 2,638,663 | Bartlett | May 19, 1953 |
| 2,712,688 | Steinmeyer | July 12, 1955 |
| 2,716,270 | Gibian | Aug. 30, 1955 |
| 2,743,509 | Friedman | May 1, 1956 |
| 2,766,645 | Nichols | Oct. 16, 1956 |

FOREIGN PATENTS

| | | |
|---|---|---|
| 86,446 | Switzerland | Sept. 1, 1920 |
| 905,735 | France | Dec. 12, 1945 |
| 1,060,577 | France | July 24, 1952 |